(12) United States Patent
Majumdar et al.

(10) Patent No.: US 7,983,717 B2
(45) Date of Patent: Jul. 19, 2011

(54) METHOD FOR FAST RECOVERY OF NORMAL SERVICES

(75) Inventors: Soma Majumdar, Bangalore (IN); Gautam R R, Bangalore (IN)

(73) Assignee: Motorola Mobility, Inc., Libertyville, IL (US)

(*) Notice: Subject to any disclaimer, the term of this patent is extended or adjusted under 35 U.S.C. 154(b) by 478 days.

(21) Appl. No.: 12/199,957

(22) Filed: Aug. 28, 2008

(65) Prior Publication Data

US 2009/0061865 A1    Mar. 5, 2009

(51) Int. Cl.
*H04W 88/02* (2009.01)
(52) U.S. Cl. .................................................. 455/561
(58) Field of Classification Search ............... 455/3.04, 455/415, 421, 440, 443, 445, 453, 516, 560, 455/561
See application file for complete search history.

(56) References Cited

U.S. PATENT DOCUMENTS

| | | | | |
|---|---|---|---|---|
| 5,845,211 A | * | 12/1998 | Roach, Jr. ........................ | 455/436 |
| 6,308,080 B1 | * | 10/2001 | Burt et al. ........................ | 455/522 |
| 6,411,810 B1 | * | 6/2002 | Maxemchuk ................... | 455/453 |
| 7,463,887 B2 | * | 12/2008 | Roberts et al. .............. | 455/435.2 |
| 2007/0042775 A1 | * | 2/2007 | Umatt et al. ................... | 455/434 |

OTHER PUBLICATIONS

3RD Generation Partnership Project, "Technical Specification Group core Network and Terminals, Non-Access-Stratum (NAS) functions related to Mobile Station (MD) in idle mode," (3GPP TS 23.122), V6.5.0, Jun. 2005, Valbonne, France.

* cited by examiner

*Primary Examiner* — Diane Mizrahi

(57) ABSTRACT

A method for fast recovery of normal services on repeatedly traversed routes is disclosed. A mobile device searches for recent cell information when the mobile device loses normal services. When the recent cell information is found, the mobile device may retrieve designated cells information associated with the recent cell information. The designated cells information identifies a set of designated cells from which the mobile device has most recently regained normal services. The mobile device then scans the set of designated cells to determine whether a designated cell is available to the mobile device and then acquires normal services from the available designated cell.

22 Claims, 4 Drawing Sheets

METHOD FOR FAST RECOVERY OF NORMAL SERVICES

FIELD OF THE DISCLOSURE

The present disclosure relates generally to the field of mobile devices, and more particularly to fast recovery of normal services by a mobile device that is used on repeatedly traversed routes.

BACKGROUND

While traveling, many a times mobile devices lose normal services that are required by a mobile device for communication. The mobile device loses normal services due to no services or limited services in certain areas. This causes a lot of inconveniences to mobile device users, for example, a mobile device user may miss out some important calls or the mobile device user may not have access to some important information. There are quite a few methods known in the art that may help the mobile device regain normal services. Generally, the methods known in the art scan for all the cells (even on repeatedly traversed routes) that may be available in an area to provide normal services to the mobile device. Such methods consume a lot of time and battery in scanning and registering on a cell to regain normal services. So, there is a need for a method that may help a mobile device regain normal services faster to save on time and battery on repeatedly traversed routes.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
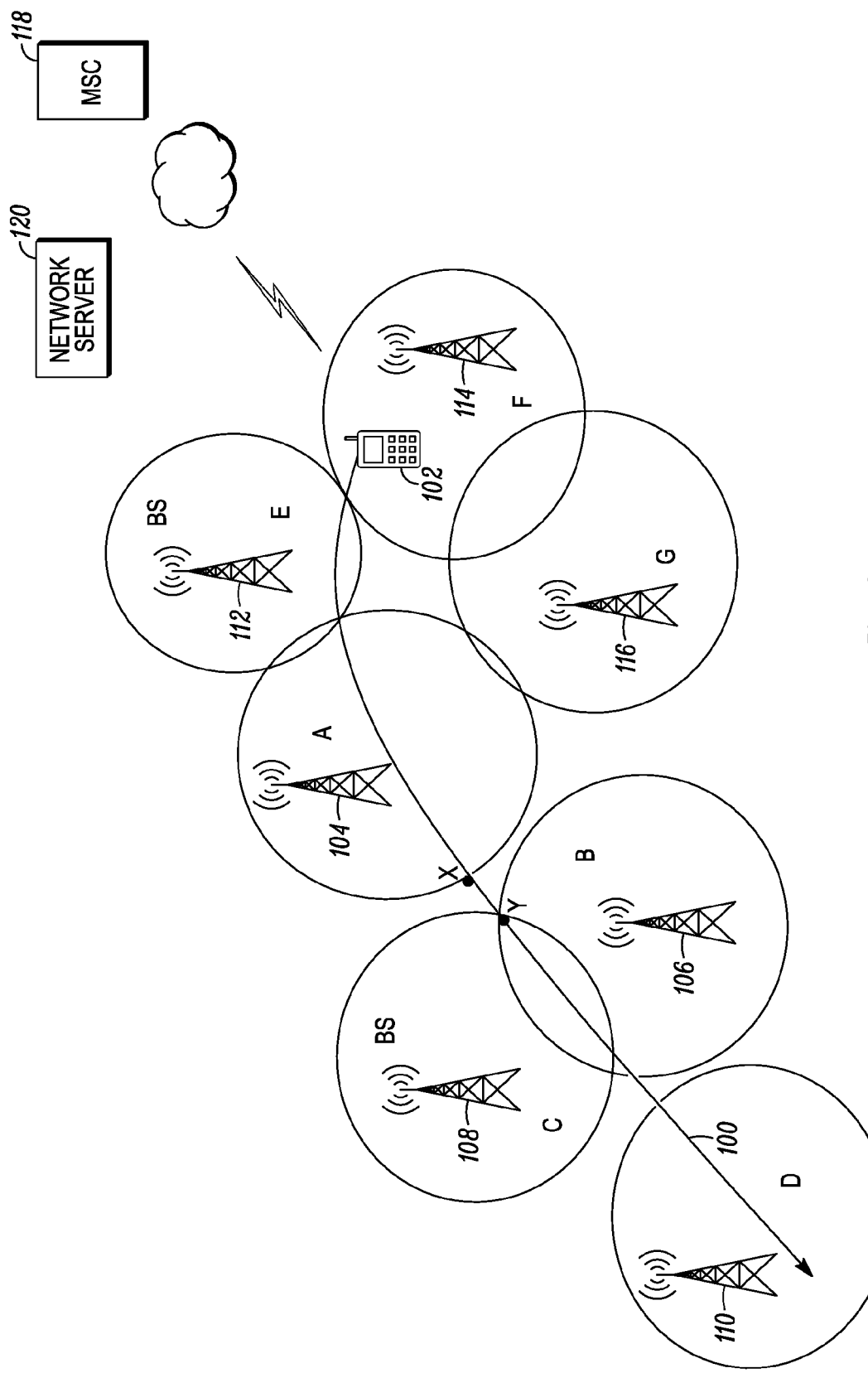
FIG. 1 illustrates a route traversed by a mobile device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Before describing in detail embodiments that are in accordance with the present invention, it should be observed that the embodiments reside primarily in a method to regain normal services faster on repeatedly traversed routes. Accordingly, the method has been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

FIG. 1 illustrates a route 100 traversed by a mobile device 102 in accordance with some embodiments. FIG. 1 may comprise the mobile device 102, a plurality of base stations (104-116), one or more Mobile Switching Centers (MSCs) 118, a network server 120 and a plurality of cells A to G. Each of the plurality of cells A to G is serviced by at least one base station. In the illustrated embodiment, cell A is serviced by the base station 104, cell B is serviced by the base station 106, and similarly, each cell is serviced by at least one base station.

The mobile device 102 has the capability to communicate with the base stations (104-116) through wireless communication protocols such as AMPS, CDMA, TDMA, GSM, iDEN, GPRS, EDGE, UMTS, WCDMA, CDMA2000, and their variants. The mobile device 102 may be any suitable wireless communication device, e.g. a cell phone, a personal digital assistant (PDA), a hand-held computer, a Bluetooth headset, and the like.

In the illustrated embodiment, cells A to G represent areas that are serviced by or covered by the base stations (104-116) to provide normal services to subscribers in these cells. Cells A to G are shown approximately circular for a better understanding of the invention. However it should be noted that, in a typical cellular wireless communication network, true cells are irregular in shape and with different configurations. The shape and configuration of a cell depends on various features such as terrain, natural obstructions, man made obstructions and the like.

For simplicity, only one base station is described in each of the plurality of cells A to G. However, one or more base stations may be present in each of the plurality of cells A to G. The base stations 104-116 (or cells A to G) provide normal services to the mobile device 102. Under normal services, for example, the base stations (104-116) transfer and receive voice and data signals from the mobile device 102 and the base stations (104-116) also transfer data packets using GPRS or Internet to the mobile device 102. In an example, the base stations 104-116 communicate with the MSC 118 to provide normal services to the mobile device 102. The MSC 118 collects data from the base stations (104-116) and forwards the collected data to the network server 120. The collected data may include information related to the wireless communication protocols used by the mobile device 102. In an embodiment, the base stations (104-116) comprise one or more base station controller and one or more base transceiver station. For simplicity, the base station controller and the base transceiver station are collectively shown as base stations 104 to 116 in the FIG.

As an example of some embodiments, the mobile device 102 travels through route 100 from cell F to cell D. Initially, cell F provides normal services to the mobile device 102. When the mobile device 102 moves out of cell F, the mobile device 102 acquires normal services from cell E. From cell E, the mobile device 102 moves to cell A and acquires normal services from cell A. While the mobile device 102 is moving out of cell A, say at point X, the mobile device 102 may not find a cell which is available to provide normal services to the mobile device 102. The mobile device 102 continues to scan for cells that are available to provide normal services to the mobile device 102. On reaching, say point Y, the mobile device 102 regains normal services from cell B or cell C. At point Y, the mobile device 102 stores information in a memory about cell A from which the mobile device 102 lost normal services and also stores information about cell B and cell C that were available to the mobile device 102. In this example, cell A is referred as a recent cell and cells B and C are referred as a set of designated cells. The recent cell is a cell from which the mobile device 102 has most recently lost normal services. The set of designated cells are the set of cells that are available to the mobile device 102 when the mobile device 102 lost normal services from the recent cell. Thus, recent cell information and designated cells information are stored in the memory, where the designated cells information is associated with the recent cell information.

In an embodiment, while moving out from cell E, the mobile device 102 may lose normal services. The mobile device 102 enters cell A and acquires only emergency services from cell A. Using emergency services, the mobile device 102 would be able to make only emergency calls, for example, to an ambulance or to police. Using emergency services, the mobile device 102 will not able to enjoy normal services. In this case, the mobile device 102 is in a constant search for a network or a cell which may be available to the mobile device 102. In this embodiment, cell A may be called as a recent cell. Here, the recent cell is a cell which may provide only emergency services to the mobile device 102. Hence, a recent cell is a cell which is either providing emergency services to the mobile device 102 or a cell from which the mobile device 102 lost normal services. In another example, when the mobile device moves from cells A→B→C→D, where A and D provide normal services and B and C provide emergency services, then only cell C is stored in the database as the recent cell (not both cells B and C) because C provided emergency services most recently.

In an embodiment, where more than one cell are available to provide normal services to the mobile device 102, the mobile device 102 may camp and register on a cell that may provide best services (among the cells) to the mobile device 102. For example, the mobile device 102 may camp and register on to cell B to acquire normal services when the cell B is providing better services to the mobile device 102 than cell C. The information that the mobile device 102 has registered on cell B and not on cell C, will also be stored in the memory of the mobile device 102.

Further, since the mobile device 102 is moving, the mobile device 102 may go out of cell B and may again lose normal services. As the mobile device 102 moves further, there may exist cell D which may be available to the mobile device 102. The mobile device 102 may register on cell D to acquire normal services. The mobile device 102 may then store information related to cell B along with the information related to cell D in the memory. Here, cell B is the recent cell and cell D is the designated cell.

Figure 2:
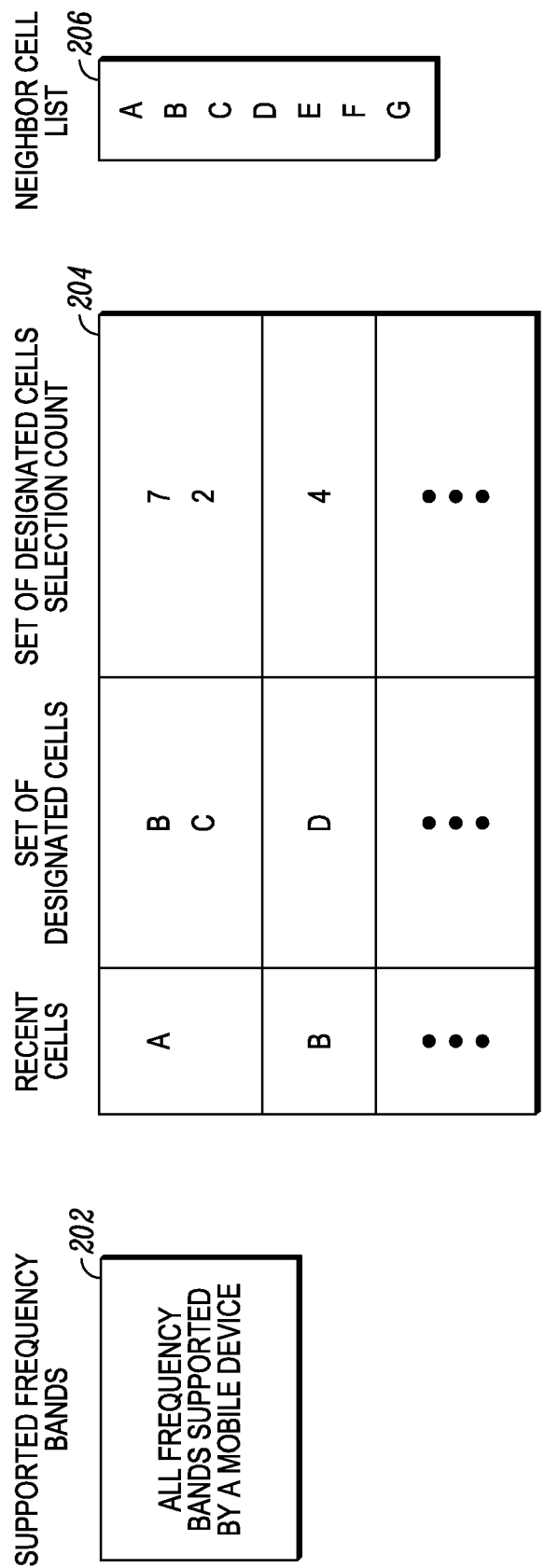
FIG. 2 shows a database in accordance with some embodiments.

Referring to FIG. 2, a database 200 is shown that resides inside the mobile device 102, wherein the database 200 is in the memory of the mobile device 102. The database 200 may be divided, for example in three sections (202-206), the first section 202 may store information about all frequency bands that are supported by the mobile device 102. The supported frequency bands are the bands of different frequencies that are supported by the mobile device 102 and that may provide normal services to the mobile device 102. The second section 204 may store recent cell information, designated cells information and a set of designated cells selection count. Recent cell information identifies a list of recent cells and designated cells information identifies a set of designated cells. The set of designated cells selection count keeps a track of the number of times a particular designated cell is being used to regain normal services for a particular recent cell. The third section 206 of the database stores information regarding a neighbor cell list. The neighbor cell list may comprise a list of all cells, for example, cells A to G that are around the mobile device 102 and that may be available to the mobile device 102.

The second section 204 of the database 200 may store recent cell information and designated cells information in the form of a group. For example, the information about cell B is stored in the database 200 along with the information of cell A, where cell B is the designated cell and cell A is the recent cell. The reason to store information in a group is to create statistics based on history that may show the loss of normal services from one cell (cell A) and the gain of normal services of another cell (cell B). Similarly, the information about cell C (designated cell) is also stored in the database 200 along with the information of cell A for the same reason. Storing information in the form of a group (A with B and C) in the database 200 may be used effectively by the mobile device 102. For example, when the mobile device 102 loses normal services from cell A during the next travel through the route 100, the mobile device 102 would know the cells which are to be scanned first to regain normal services as those cells would be stored in the database 200. For example, when the mobile device 102 loses normal services from the cell A the next time, the mobile device 102 may first scan cell B and then scan cell C which were available to the mobile device 102 when the mobile device 102 traveled through the route 100 last time. In one example, the mobile device 102 may be able to judge which cell to be scanned first by comparing the designated cell selection count of available designated cells. In this example, cell B may be scanned first because cell B was used more frequently by the mobile device 102 to regain normal services.

The recent cell information may comprise information like, whether the recent cell is the cell from which the mobile device 102 lost normal services or whether the recent cell is the cell which was providing emergency services to the mobile device 102 during the last travel through the route 100.

The recent cell information may further comprise information like frequency range of the recent cell (not shown in FIG.), location of the recent cell (not shown in FIG.) and other related information that distinguishes the recent cell from other cells. Similarly, the designated cells information may comprise information like frequency range of the cells, location of the cells and other related information that distinguishes the designated cells from other cells. The recent cell information and the corresponding designated cells information are stored together in a group in the database 200.

Any other cell that may be available to the mobile device 102, when the mobile device 102 loses normal services from cell A or when the mobile device 102 was operating in emergency services may become a part of the set of designated cells. The mobile device 102 may store information in a manner such that it is known to the mobile device 102 that when the mobile device 102 lost normal services from cell A during the last travel through route 100, the mobile device 102 acquired normal services from cell B. The mobile device 102 would also be aware of the cells which were available to provide normal services last time and their frequency of use as a designated cell. Thus, this may help the mobile device 102 to scan only a limited number of cells to acquire normal services when the mobile device 102 loses normal services from cell A for the next time. Thus, the mobile device 102 may scan only a limited number of cells in a priority of frequency of use and hence may lead to faster recovery of normal services along with the reduction in battery consumption, in comparison to using the neighbor cell list 206 in a manner not related to prior history.

Figure 3:
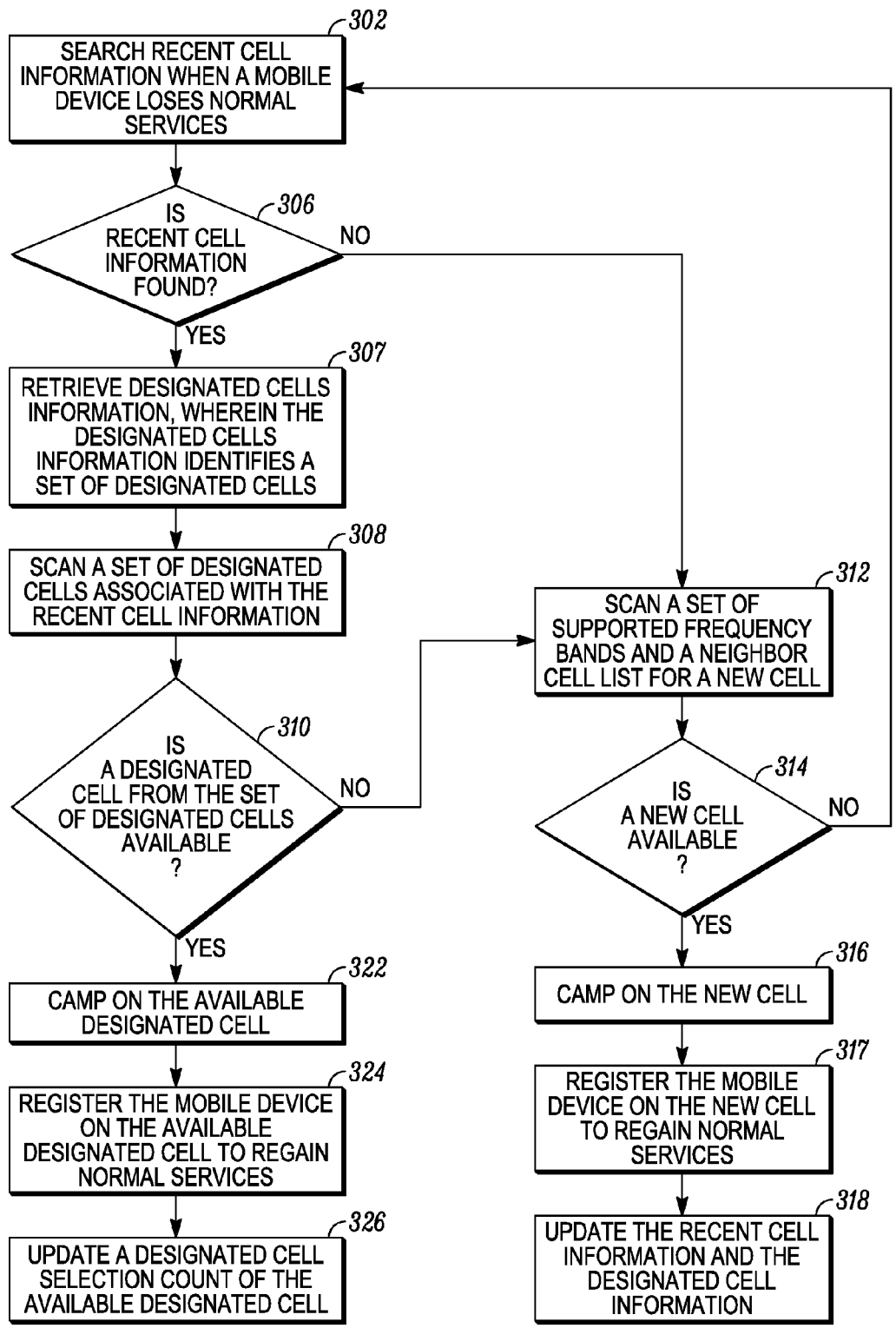
FIG. 3 is a flowchart of some steps of a method in accordance with some embodiments.

FIG. 3 is a flowchart of some steps of a method in accordance with some embodiments. In one example, the mobile device 102 is operating on normal services that are provided to the mobile device 102 by a cell or network. The mobile device 102 may start moving out of the cell and may lose normal services. At step 302, the mobile device 102 may start searching for recent cell information that may be stored in the database 200. As explained above, the recent cell information identifies recent cells from which the mobile device 102 lost normal services. when the recent cell information is found in the database 200, this could mean that the mobile device 102 had lost normal services from this particular cell during the last travel through the route 100. The database 200 could have information about the cells that were available previously to the mobile device 102 i.e. designated cells information. The set of designated cells may include a set of cells successfully used by the mobile device 102 to acquire normal services after losing normal services from the recent cell during the last travel through the route 100. When the recent cell information is found in the database, then at step 307, the mobile device 102 retrieves designated cells information, wherein the designated cells information identifies a set of designated cells.

At step 308, the mobile device 102 may scan the set of designated cells associated with the recent cell information. The scanning may be done in order of frequency of use of each designated cell. At step 310, the mobile device 102 may check whether a designated cell from the set of designated cells is available to the mobile device 102. When a designated cell from the set of designated cells is available to the mobile device 102, then at step 322 the mobile device 102 may camp on the available designated cell using the set of designated cells. After camping on the available designated cell, the mobile device 102 may register on the available designated cell to regain normal services at step 324. After regaining normal services, at step 326, the mobile device 102 updates the designated cell selection count of the acquired designated cell so as to facilitate designated cell selection during the next travel of the mobile device 102 through the route 100. Updating the designated cell selection count may require incrementing the designated cell selection count by one.

At step 310, when the mobile device 102 is not able to find a designated cell or when the mobile device 102 is not able to find recent cell information in the database 200 (at step 306), in both scenarios the mobile device 102 may scan the neighbor cell list 206 and the set of supported frequency bands 202 for a new cell at step 312. At step 314, the mobile device 102 may check if a new cell is available to the mobile device. When a new cell is available to the mobile device 102, the mobile device 102 may camp on the new cell at step 316. At step 317, mobile device 102 may register on the new cell. After registering on the new cell the mobile device 102 acquires normal services from the new cell and updates recent cell information and designated cells information in the database 200 at step 318. Updating information may require adding the new cell to the set of designated cells and adding the new recent cell in the recent cell information in order to facilitate designated cell selection during the next travel of the mobile device 102 through the route 100.

At step 314, when a new cell is not found by the mobile device 102 in the scanning process, the mobile may again start searching recent cell information in the database 200 at step 302. The process may continue until the mobile device 102 finds a cell that can provide normal services to the mobile device 102. Other arrangements of these steps may provide similar benefits. For example, the "No" path from block 314 could go to the input of step 312.

Figure 4:
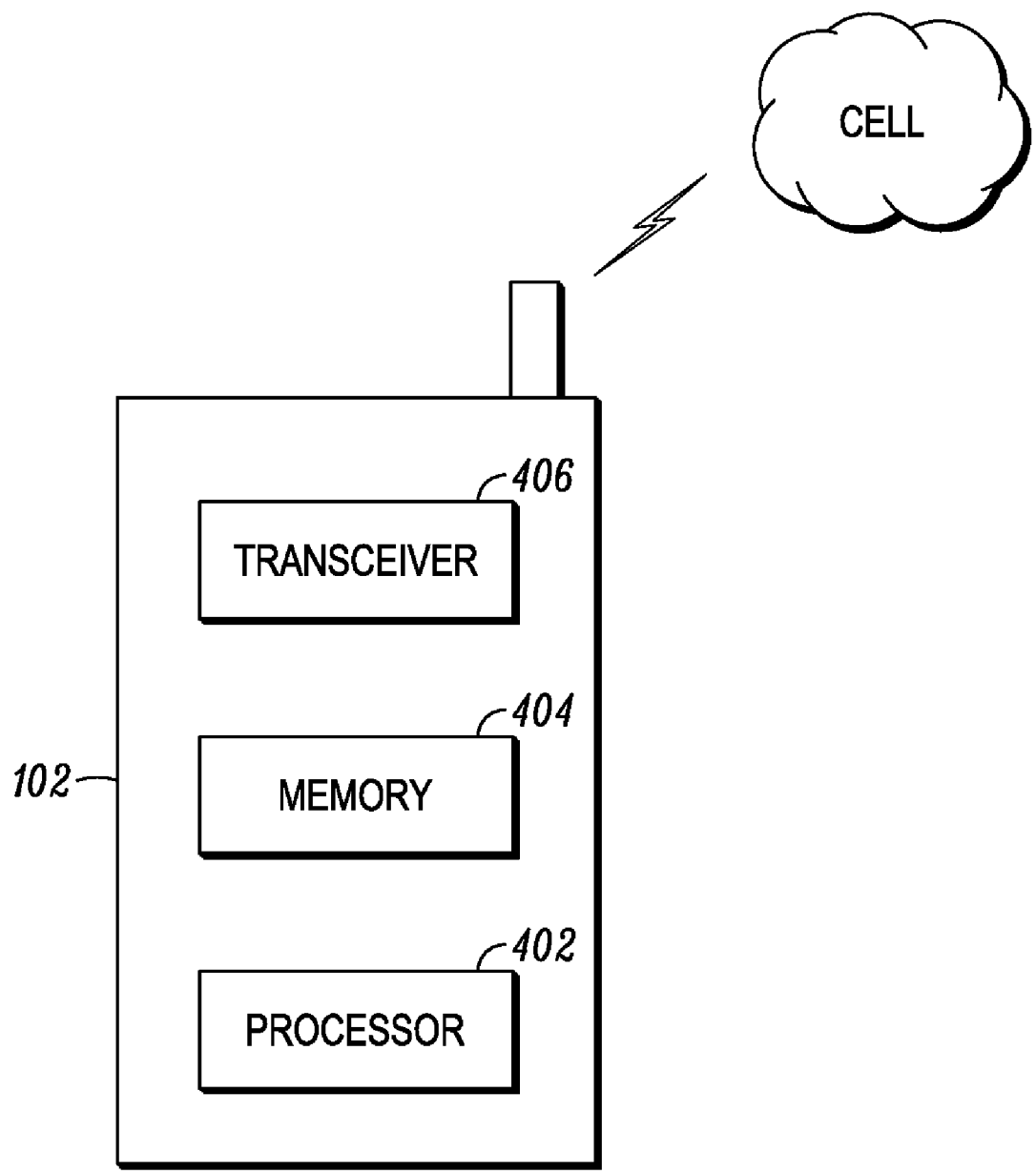
FIG. 4 shows a diagram of a system in accordance with some embodiments.

FIG. 4 shows a diagram of a system in accordance with some embodiments.

The system comprises the mobile device 102 and a cell that may provide normal services to the mobile device 102. The mobile device 102 may comprise a processor 402, a memory 404 and a transceiver 406. The memory 404 may comprise an instruction memory portion and a data memory portion (not shown in FIG.). Each portion may comprise more than one memory device, or both portions may be included in one memory device. The instruction memory portion is used to store a set of programmed instructions that may be used by the processor 402 to execute the steps described with reference to FIG. 3. The data memory stores the database 200 that stores recent cell information, the designated cells information, and the designated cell selection count. The data memory portion may also store information relating to the set of supported frequency bands and information relating to the neighbor cell list.

The transceiver 406 is used to send and receive signals to the base stations (104 to 116) and perform other functions known in the art.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for fast recovery of normal services on repeatedly traversed routes comprising:
at a mobile device
searching for recent cell information when the mobile device loses normal services, wherein the recent cell information identifies a recent cell;
retrieving designated cells information when the recent cell information is found, wherein the designated cells information is associated with the recent cell information and wherein the designated cells information identifies a set of designated cells from which the mobile device has most recently regained normal services;
scanning the set of designated cells to determine whether a designated cell is available to the mobile device; and
acquiring normal services from the available designated cell to employ fast recovery of normal services for the mobile device while the mobile device is on repeatedly traversed routes.

2. The method of claim 1, wherein the recent cell is a cell from which the mobile device lost normal services.

3. The method of claim 1, further comprising registering the mobile device on the available designated cell.

4. The method of claim 1, further comprising updating a designated cell selection count of the available designated cell to identify the number of times the available designated cell has been used by the mobile device to regain normal services.

5. The method of claim 4, wherein the recent cell information, the designated cells information, and the designated cell selection count are comprised in a database.

6. The method of claim 1, further comprising scanning a neighbor cell list and a set of supported frequency bands for a new cell on a route of the mobile device, when (a) the recent cell information is not found, or (b) when a designated cell is not available.

7. The method of claim 6, further comprising acquiring the new cell when the new cell is available.

8. The method of claim 6, further comprising registering the mobile device on the new cell.

9. The method of claim 6, further comprising updating the recent cell information by adding information about a new recent cell, wherein the new recent cell is associated with the new cell.

10. The method of claim 6, further comprising updating the designated cells information by adding information about the new cell wherein the information identifies the new cell as a designated cell in the set of designated cells.

11. The method of claim 1, wherein the recent cell is a cell which was providing emergency services to the mobile device.

12. A mobile device comprising:
at least one memory; and
at least a processor, controlled by stored programmed instructions in the at least one memory to perform functions of
searching for recent cell information in the at least one memory when the mobile device loses normal services, wherein the recent cell information identifies a recent cell;
retrieving designated cells information from the at least one memory when the recent cell information is found in the at least one memory, wherein the designated cells information is associated with the recent cell information and wherein the designated cells information identifies a set of designated cells from which the mobile device has most recently regained normal services;
scanning the set of designated cells to determine whether a designated cell is available to the mobile device; and
acquiring normal services from the available designated cell to employ fast recovery of normal services for the mobile device while the mobile device is on repeatedly traversed routes.

13. The mobile device of claim 12, wherein the recent cell is a cell from which the mobile device lost normal services.

14. The mobile device of claim 12, wherein the processor is further operable to register the mobile device on the available designated cell.

15. The mobile device of claim 12, wherein the processor is further operable to update a designated cell selection count of the available designated cell in the at least one memory to identify the number of times the available designated cell has been used by the mobile device to regain normal services.

16. The mobile device of claim 15, wherein the recent cell information, the designated cells information, and the designated cell selection count are comprised in a database in the at least one memory.

17. The mobile device of claim 12, wherein the processor is further operable to scan a neighbor cell list and a set of supported frequency bands for a new cell on a route of the mobile device, when (a) the recent cell information is not stored in the at least one memory, or (b) when a designated cell is not available.

18. The mobile device of claim 17, wherein the processor is further operable to acquire the new cell when the new cell is available.

19. The mobile device of claim 17, wherein the processor is further operable to register the mobile device on the new cell.

20. The mobile device of claim 17, wherein the processor is further operable to update the recent cell information by adding information about a new recent cell, wherein the new recent cell is associated with the new cell.

21. The mobile device of claim 17, wherein the processor is further operable to update the designated cells information by adding information about the new cell wherein the information identifies the new cell as a designated cell in the set of designated cells.

22. The mobile device of claim 12, wherein the recent cell is a cell which was providing emergency services to the mobile device.

* * * * *